United States Patent [19]

Kramer et al.

[11] 4,438,568

[45] Mar. 27, 1984

[54] RECREATIONAL COMPASS

[75] Inventors: Melvin G. Kramer; Marlin Iden, both of Riverton, Wyo.

[73] Assignee: The Brunton Company, Riverton, Wyo.

[21] Appl. No.: 319,208

[22] Filed: Nov. 9, 1981

Related U.S. Application Data

[63] Continuation-in-part of Ser. No. 129,907, Mar. 13, 1980, abandoned.

[51] Int. Cl.³ .................. G01C 17/20; G01C 17/12
[52] U.S. Cl. .................................. 33/348; 33/272; 33/355 R; 33/364
[58] Field of Search ............... 33/272, 355 R, 364, 33/273, 348

[56] References Cited

U.S. PATENT DOCUMENTS

| | | | |
|---|---|---|---|
| 1,571,697 | 2/1926 | Bernegau | 33/273 |
| 2,019,411 | 10/1935 | Hassell . | |
| 2,111,829 | 3/1938 | Winterer et al. | 33/272 |
| 2,136,970 | 11/1938 | Ekeberg . | |
| 2,331,747 | 10/1943 | Tillander . | |
| 2,358,589 | 9/1944 | Piffath | 33/364 |
| 3,184,854 | 5/1965 | Grasse | 33/272 |
| 3,248,793 | 5/1966 | Anderson | 33/67 |
| 4,158,260 | 6/1979 | Benger et al. | 33/272 |
| 4,236,316 | 12/1980 | Suzuki | 33/364 |

FOREIGN PATENT DOCUMENTS

| | | | |
|---|---|---|---|
| 179105 | 7/1954 | Austria | 33/272 |
| 101995 | 7/1951 | Sweden | 33/272 |
| 795255 | 5/1958 | United Kingdom | 33/272 |

Primary Examiner—William D. Martin, Jr.
Attorney, Agent, or Firm—John E. Reilly

[57] ABSTRACT

A recreational or sportman's compass is comprised of an inner vial including a compass needle which together with an azimuth ring is resiliently mounted within a housing so as to be rotatable together or independently of one another. The vial is assembled together with the outer azimuth ring and retainer in such a way as to permit assembly of the parts into snug-fitting concentric relation to the housing without the necessity of positively fastening or affixing the vial to the housing.

18 Claims, 10 Drawing Figures

RECREATIONAL COMPASS

This application is a continuation-in-part of U.S. Ser. No. 129,907, filed Mar. 13, 1980 for RECREATIONAL COMPASS, now abandoned and assigned to the assignee of the present application.

This invention relates to compasses and more particularly relates to hand-held compasses of the type which are specifically adaptable for use in direction-finding and locating positions on topographic maps.

BACKGROUND AND FIELD OF THE INVENTION

Recreational compasses are generally designed and intended to withstand more than the normal abuse and shock while being relatively lightweight in construction so that they can be easily carried or stored. It is especially important to construct and mount an azimuth ring and needle assembly so as to be selectively rotatable together or individually. Further, it is highly desirable to at least partially enclose the casing for the needle on a base plate or other base member in such a way as to avoid the use of positive fasteners while permitting rapid assembly of the needle so as to be resiliently suspended within the housing.

In the past, various approaches have been taken to compass mounting devices and especially those of the type commonly referred to as recreational compasses. For instance, U.S. Letters Patent to Ekeberg U.S. Pat. No. 2,136,970 discloses the resilient mounting of a pin support for a compass needle. U.S. Letters Patent No. to Tillander U.S. Pat. No. 331,747 is directed more to permanent fastening of a liquid filled compass on a base member but is not concerned with resilient mounting. Moreover, U.S. Letters Patent No. to Hassel U.S. Pat. No. 2,019,411 discloses and is representative of more conventional approaches taken to mounting of a needle on a base plate but employs positive fasteners or screws in attaching the casing or housing for the needle to the base member.

Other patents of interest are U.S. Letters Patent No. to Anderson U.S. Pat. No. 3,248,793, Benger et al U.S. Pat. No. 4,158,260, Suzuki U.S. Pat. No. 4,236,316 and Piffath U.S. Pat. No. 2,358,589.

SUMMARY OF THE INVENTION

It is therefore an object of the present invention to provide for a novel and improved compass especially adaptable for outdoor and recreational purposes which is simple and durable in construction, economical to manufacture and which can be rapidly assembled.

It is another object of the present invention to provide for a novel and improved means for mounting a fluid-filled vial and azimuth ring in self-centered relation to a base.

A further object of the present invention is to provide for a novel and improved means for frictionally securing a compass vial and needle assembly within an open housing formed on a base so that the assembly can be positively rotated to a desired position but not be subject to accidental movement or rotation.

In accordance with the present invention, one form of compass comprises a needle suspended within a casing, such as, a fluid-filled vial, the vial being frictionally secured within a housing which projects upwardly from a base. The base for the compass is preferably of the type comprising an elongated or oblong transparent member provided with sights or directional markings thereon and also may be typically provided with a hinged cover provided with a mirror to facilitate use of the compass. In order to permit mounting of the vial on the base, an upstanding peripheral flange or housing wall is sized for insertion of the vial, and a resilient member preferably in the form of a spring is interpositioned between the bottom of the vial and the base plate. Complementary locking means includes a ledge or shoulder protruding inwardly toward the outer wall of the vial from the inner wall surface of the housing. An azimuth ring support is formed as a spacer or retainer member which is insertable between the outer wall of the vial and the housing wall. The retainer ring has a ring-like locking member movable past the shoulder in the direction of insertion into the housing until the vial bears against the resilient base member, at which point the locking member will resist movement of the vial and ring in the direction of release from the housing while permitting rotation of the vial and azimuth ring with respect to the housing. The ring-like locking member is in the form of an outer sealing ring which is compressed between radial extensions on the outer wall of the vial and the retainer ring to cause the two elements normally to rotate together owing to the frictional engagement with the sealing ring. The vial and azimuth are so dimensioned as to be spring-loaded under some pressure against the resilient base member to maintain the frictional engagement between the vial and ring with the sealing ring. However, the vial is capable of being depressed against the loading of the resilient base member so as to release the vial from its frictional engagement with the frictional ring and to permit the azimuth ring to be rotated independently of the vial in taking various readings.

In another form of the present invention, a base member of the type described with reference to the first form of compass is provided with a raised annular portion or housing wall sized for insertion of a vial-retainer ring, and a compass needle suspended within a fluid-filled vial mounted within the retainer ring. The retainer ring is resiliently mounted within the housing wall of the base member by complementary locking means including a shoulder which protrudes inwardly from the housing wall and a ring-like member on the retainer ring which is movable past the shoulder into yieldable, frictional engagement with the housing wall of the base member at which point the shoulder will resist movement of the retainer ring in the direction of release from the housing while permitting rotation of the vial and ring with respect to the housing. The complementary locking means between the ring and housing wall effect resilient mounting of the ring in such a way that the ring is self-centering within the housing. In addition, complementary locking means between the vial and retainer ring are operative to securely lock the vial against release from the ring while permitting the vial to be positively rotated independently of the ring. In this way, a single element; namely, the retainer ring is capable of establishing the necessary locking engagement between the vial and base member; yet the vial and ring are capable of normally rotating together independently of the base member, and the vial is capable of selective rotation independently of the ring and base member.

The above and other objects, advantages and features of the present invention will become more readily understood and appreciated from a consideration of the following detailed description of a preferred embodiment of the present invention when taken together with the accompanying drawings in which:

DETAILED DESCRIPTION OF THE PREFERRED EMBODIMENT

Figures 1, 2:
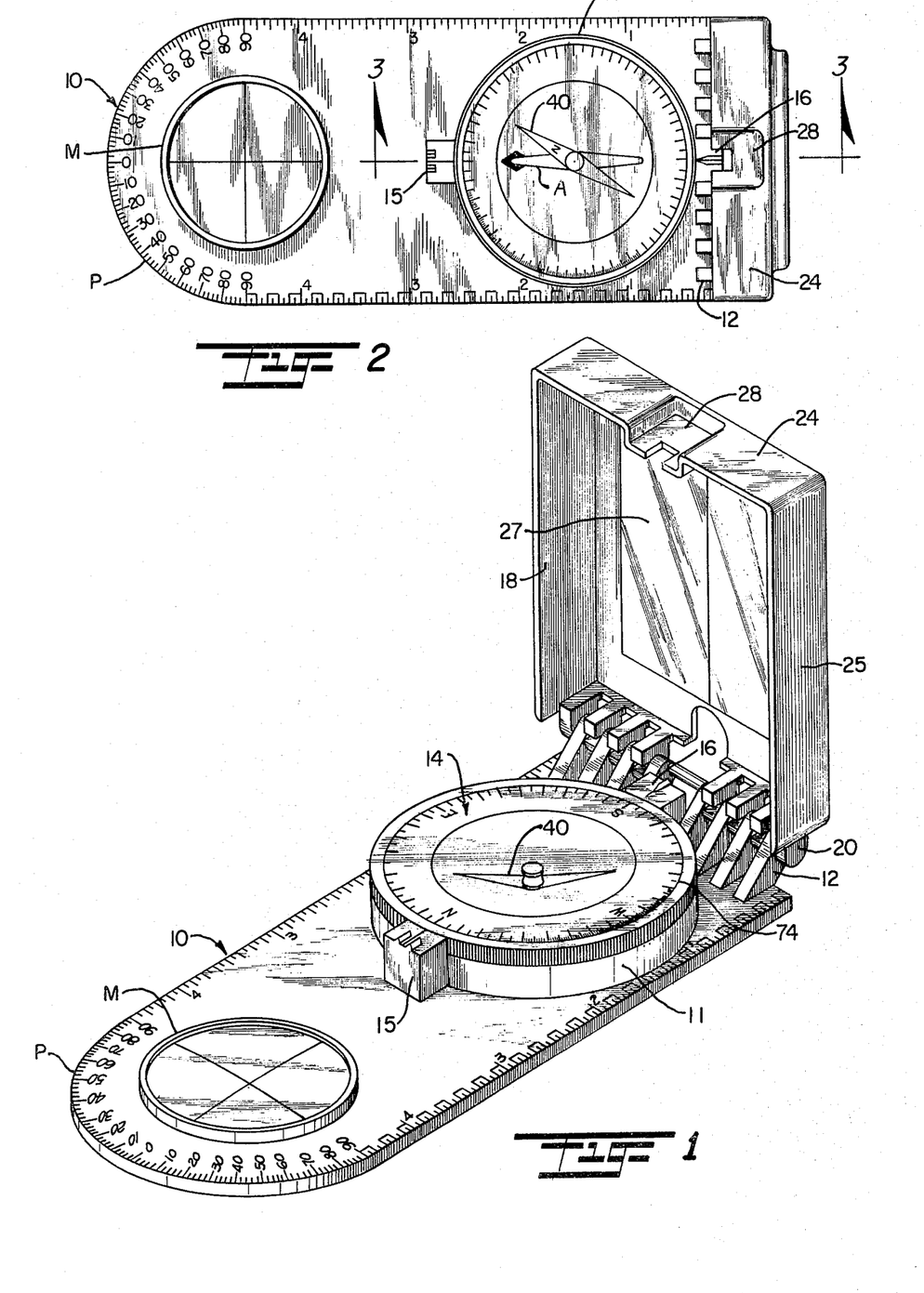
FIG. 1 is a perspective view of one form of compass in accordance with the present invention.
FIG. 2 is a top plan view of the preferred form shown in FIG. 1.
Figure 3:
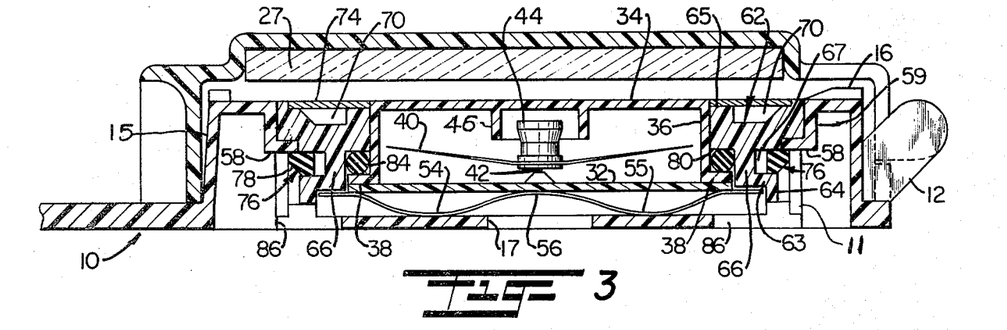
FIG. 3 is a cross-sectional view of the preferred form of invention shown in FIGS. 1 and 2 but with the cover portion eliminated.
Figure 4:
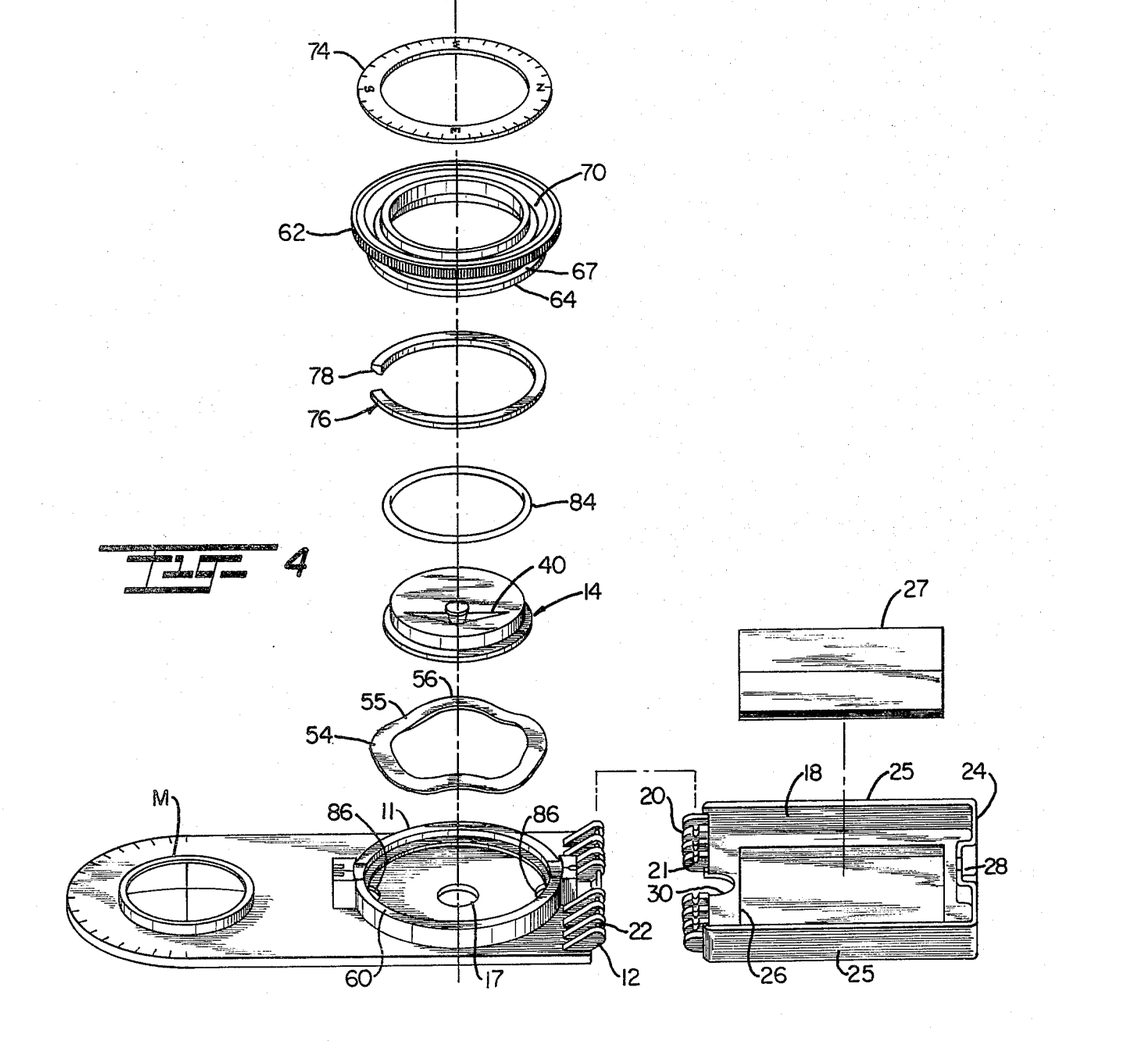
FIG. 4 is an exploded, perspective view of the preferred form of invention shown in FIG. 1.
Figure 5:
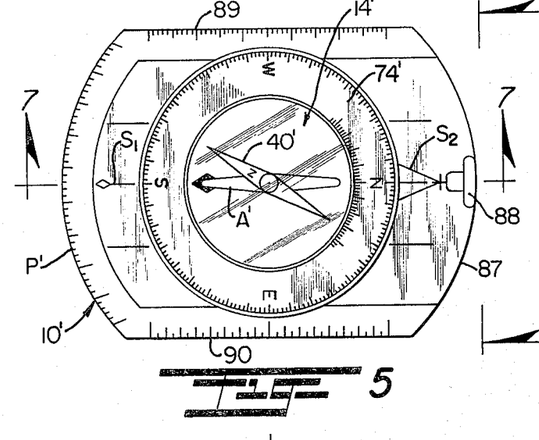
FIG. 5 is a plan view of an alternate form of compass assembly in accordance with the present invention.

Referring in detail to the drawings, there is shown by way of illustrative example in FIGS. 1 and 2 a compass of the type having an elongated transparent base plate conventionally provided with a semi-circular end or protractor P having indicia which are divided into angular or degree markings from zero to 90° running along opposite quadrants of the end P. In addition, suitable measurements may be provided along opposite longitudinal edges of the base to form rules. A suitable magnifying glass designated at M is incorporated into the body of the base adjacent to the curved end P, and an upstanding circular flange or housing wall 11 is formed adjacent to the opposite hinged end portion 12 of the base. The upstanding wall 11 has a peripheral ledge or shoulder 60 at its upper end which cooperates in retaining a self-contained vial assembly 14 to be hereinafter described in more detail in place within the housing 11. In addition, diametrically opposed rear and front sights 15 and 16 are provided on the peripheral flange 11 and are formed symmetrically of the longitudinal axis of the base plate. As seen in FIGS. 3 and 4, the upstanding wall 11 is formed in surrounding relation to a circular opening or aperture 17, and the opening 17 is also formed symmetrically of the longitudinal axis of the base plate.

A cover 18 has a complementary hinge portion 20 to the hinge portion 12 and has slotted ends 21 which are adapted to interleave with the hinged portion 12 on the base plate and to receive a pin 22 which extends through the outer free ends of the hinge portions 12 and 20. The cover 18 as well as the hinge portions are of conventional construction and will not be described in any detail other than to generally characterize the cover as being of rectangular configuration having an end wall 24, opposite sidewalls 25 and an opening 26 in which is mounted a mirror 27 with a central sight line. The cover is also recessed as at 28 so as to permit insertion of the sight 15 on the base plate when the cover is swung into a closed position over the vial assembly. Similarly, a slotted portion 30 which is formed intermediately of the hinge portions 20 is adapted to extend over the sight portion 16 at the hinged end of the base plate to permit viewing along the sights 15 and 16 when the mirror is in use.

A particular feature of the present invention resides in the manner in which the vial assembly 14 is adapted for press-fit, yieldable insertion into the flange or housing 11. The vial assembly 14 comprises a casing which is made up of a bottom circular transparent plate 32, and a cap 34 of inverted, generally cup-shaped configuration is provided with a downwardly directed outer circumferential wall 36 terminating in a radially outwardly directed flange 38 which is secured to the outer peripheral edge of the plate 32 so as to form a sealed enclosure or casing. In a conventional manner, the vial proper is filled with a clear liquid and contains a needle 40 which is journaled on a pin 42, the latter supported at the center of the plate 32 for upward extension into a hollow holder 44 and which is disposed in a suitable bearing surface for the needle whereby to suspend the needle or pointer for rotation about the pin 42. Preferably the needle is secured directly to the lower open end of the holder 44 and is controlled in its rotation by forming it of a magnetizable substance, all in accordance with well-known practice. If desired, the upper transparent surface of the cap 34 may be provided with a downwardly projecting, generally circular wall 46 which is disposed in outer spaced surrounding relation to the upper end of the holder 44 so as to prevent accidental displacement of the holder from the pin in the event of extreme tilting or tipping. An orienting arrow A is imprinted on the bottom transparent plate 32. The vial assembly 14 is adapted to be resiliently mounted or suspended within the housing formed by the peripheral flange 11 by supporting the vial assembly or its casing on an annular spring 54, customarily referred to as a Waverly spring, which, as best seen from FIG. 4, is somewhat warped or undulated to define peaks and valleys, there being lower edges 55 which rest on the surface of the base plate 10 and upper edges 56 which bear against the underside of the bottom plate 32 of the vial assembly.

In order to releasably retain the vial assembly 14 within the housing 11, complementary locking means are defined by the inwardly projecting ledge 60 on the housing 11, a spacer or retainer ring 62 and a ring-like locking member 76. As best seen from FIG. 3, ledges or shoulders 58 are formed as radial inward projections from the lower edges of vertical walls 59 on the sights 15 and 16, the ledges 58 coinciding with the circular flange 60 which extends around the upper edge of the housing wall 11. The spacer 62 is of generally circular or annular configuration having a bottom wall 63 which is spaced above the outer edge of spring 54, and a downwardly directed lip 64 is spaced in outer surrounding relation to the outer edge of the spring 54. The spacer has an upper azimuth ring or decal-supporting portion 65 which is relatively thick and spaced above the bottom wall 63 by a vertical wall 66 with an external annular groove 67 formed between an outer shoulder 68 and the bottom wall 63. The upper support portion 65 has a substantially flat or horizontal upper surface portion with a recessed area 70, and a decal provided with suitable azimuth markings as represented at 74 is bonded to the upper surface of the support portion 65.

The spacer 62 is also provided with a split retainer ring defining the ring-like locking member 76 which is of annular configuration and is inserted into the groove 67. The ring 76 includes an external beveled edge 78 which is tapered in a downward direction when assembled onto the body of the spacer 62. In this manner, when the spacer is inserted between the shoulders 58 and 60 and the outer wall 36 of the vial assembly, the beveled edge 78 will cause the ring 76 to be compressed or contracted inwardly into the groove 67 by the shoulders 58, 60 until the upper edge of the ring 76 clears the shoulders 58, 60. The ring 76, once it clears the shoulders 58, 60, will spring outwardly as illustrated in FIG. 3 so that its flat upper surface will be disposed in facing relation to the undersurface of the shoulders 58, 60 and prevent accidental release of the spacer 62. Complementary locking means between the retainer ring and vial comprises an internal shoulder 80 on the spacer 62 to form an annular space with the outer peripheral flange portion 38 of the wall 36 in which is positioned an O-ring 84. Accordingly, when the spacer is assembled in place in surrounding relation to the vial and the beveled edge of the ring 76 has been advanced past the shoulders 58, 60, the inner shoulder 80 of the spacer will yieldingly urge the O-ring 84 downwardly into frictional engagement against the flange 38, and the bottom wall 32 of the vial 14 will yieldingly engage the upper edges 56 of the lower spring 54.

In assembled relation, it will be observed that the vial 14 is free to move independently of the spacer 62 and azimuth ring 65, or vice versa, by depressing the vial 14 downwardly against the resilient element 54 so as to move the flange 38 away from the frictional ring 84. However, the spacer 62 will firmly seat the vial 14 in place against any tendency to be released from the flange and maintain the vial in centered or concentric relation to the housing 11. The spacer 62 is preferably composed of a material which will have some limited yield, particularly across the relatively narrow cross-section of the vertical wall 66 so that any shock or forces applied in a radial direction against the housing will be effectively absorbed by the spacer.

The present invention permits assembly of the vial 14 within the housing without the necessity of employing positive fastener elements, such as, screws and further obviates the use of electrically conductive material which could otherwise introduce error into the compass readings. For this reason, all of the parts of the compass assembly are comprised of a plastic or other electrically nonconductive material with the possible exception of spring 10 and needle 40. If it is desired to disassemble the vial, diametrically opposed slots 86 are provided in the base plate which are aligned with the beveled edge 78 so as to permit insertion of a screwdriver or other tool for the purpose of releasing the ring 76 and removing the vial 14 from the housing.

In the alternate form of invention illustrated in FIGS. 5 to 10, a compass assembly 10' is broadly comprised of a flat transparent base plate 87, a fluid-filled vial 14' containing a compass needle 40' journaled therein, and a vial retainer ring 62' serves to resiliently but securely mount the vial 14' within a housing wall 11' which is in the form of a raised annular portion extending upwardly from the base plate 87. The alternate form of base plate 87 is somewhat shorter than the elongated base plate illustrated and described with reference to FIGS. 1 to 4, but is similarly provided with an arcuate end P' having indicia which are divided into degree markings from 0° to 45°. An opposite arcuate end includes a suitable hinge portion 88 adapted to receive a cover of the same type as cover 18 shown in the form of invention illustrated in FIGS. 1 to 4 and therefore is not illustrated in this form of invention. Opposite side edges 89 and 90 are provided with suitable indicia representing inch and metric measurements. Diametrically opposed sight markings $S_1$ and $S_2$ are formed symmetrically of the longitudinal axis of the base plate outwardly of the housing wall 11'.

Figure 6:
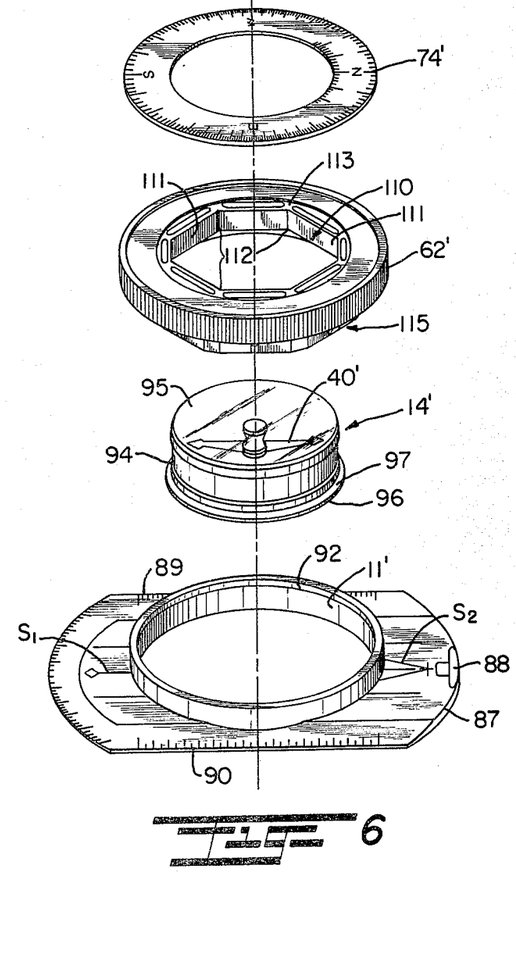
FIG. 6 is an exploded view of the alternate form of invention illustrated in FIG. 5.
Figure 7:
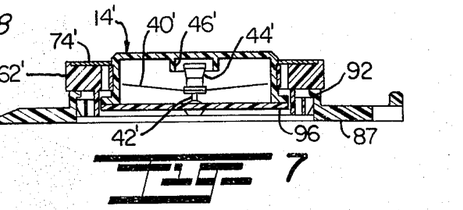
FIG. 7 is a cross-sectional view taken about lines 7—7 of FIG. 5.
Figure 8:
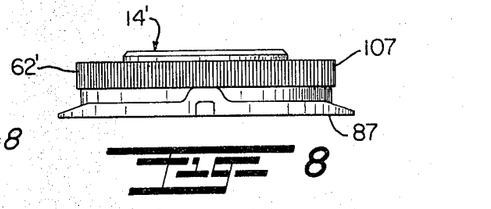
FIG. 8 is a side view in elevation of the compass shown in FIG. 5.
Figure 10:
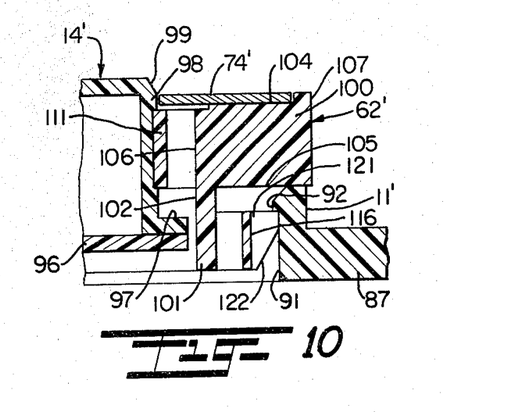
FIG. 10 is an enlarged sectional view illustrating in more detail the locking engagement between the vial, retainer ring and base member in the alternate form of compass assembly.

As illustrated in FIGS. 6, 7 and 10, the housing wall 11' is formed in surrounding relation to a circular opening or aperture 91 in centered relation to the base plate, the housing wall being of uniform thickness and diameter throughout save for an inwardly projecting shoulder or ledge 92 which projects inwardly a limited distance from the upper edge of the housing wall. The vial 14' is comprised of a transparent casing having an outer circular wall 94, an upper flat circular end surface 95 and a lower flat circular end surface 96 which is affixed to an outwardly directed flange 97 at the lower extremity of the outer peripheral wall 94. In a conventional manner, the vial proper is filled with a clear liquid and contains the needle 40' which is constructed and assembled in a manner corresponding to that described with reference to the form of invention shown in FIGS. 1 to 5. Thus, the needle 40' is journaled on a pin 42' which is supported at the center of the lower end surface 96 for upward extension into a hollow holder 44', the latter disposed in a suitable bearing surface for the needle whereby to suspend the needle for rotation about the pin 42'. Again, the needle 40' may be secured directly to the lower open end of the holder 44' and controlled in its rotation by forming of a magnetizable substance all in accordance with conventional practice. A downwardly projecting circular wall 46' is operative to prevent accidental displacement of the holder 44' from the pin 42' in the event of extreme tilting. An orienting arrow A' is imprinted on the bottom transparent end surface 96 to permit declination settings of the compass.

In order to facilitate mounting of the vial within the retainer ring 62', the upper end surface 95 protrudes slightly beyond the upper end of peripheral wall 94 to define an external shoulder or ledge 98 with a beveled edge 99 for locking engagement with a retainer ring in a manner to be described. The vial retainer ring 62' is made up of spaced upper and lower annular body portions 100 and 101, respectively, which are interconnected by a common annular portion 102, the portion 102 also forming the inner wall of the lower body portion 101. The upper body portion 100 is of a larger outside diameter than that of the lower body portion and is dimensioned to rest on the upper edge of the housing wall 11'. Further, the upper body portion 100 is generally rectangular in cross-section and has an upper flat edge surface 104, bottom surface 105 and inner and outer spaced vertical surfaces 106 and 107, respectively. The surface 107 is an externally roughened surface to facilitate grasping and manual rotation of the ring. The upper surface 104 is provided with a recessed area for disposition of a decal or plate 74' provided with azimuth markings which is bonded to the upper surface portion as shown.

A generally ring-like locking member for the vial takes the form of a multi-sided wall section 110 arranged in inner spaced concentric relation to the inner wall surface 106 of the upper body portion 100. The wall section 110 is made up of flat elongated sides or panels 111 which are joined in end-to-end relation to one another and are further joined at their ends 112 by radially extending webs 113 to the inner wall surface 106 of the body portion 100 so as to leave channels or cavities 114 between the connecting webs 113. In the form illustrated in FIGS. 8 and 9, the retainer ring has an eight-sided or octagonal wall section 110 with the effective diameter across the wall section taken at midpoints between two diametrically opposed sides 111 being slightly less than the external diameter of the vial at the shoulder 98, and the diameter across the inner wall section between diametrically opposed corners 112 being slightly greater than the diameter of the vial at the shoulder 98. In this manner, when the vial is inserted upwardly through the retainer ring 62', the beveled edge 99 of the shoulder 98 will press or expand the sides 111 outwardly until the shoulder 98 has cleared the upper edge of the sides 111 whereupon the sides will contract into snug-fitting, yieldable and frictional engagement against the outer peripheral wall 94 of the vial 14' with the shoulder resting on the upper edges of the sides 111, as illustrated in FIG. 10.

Figure 9:
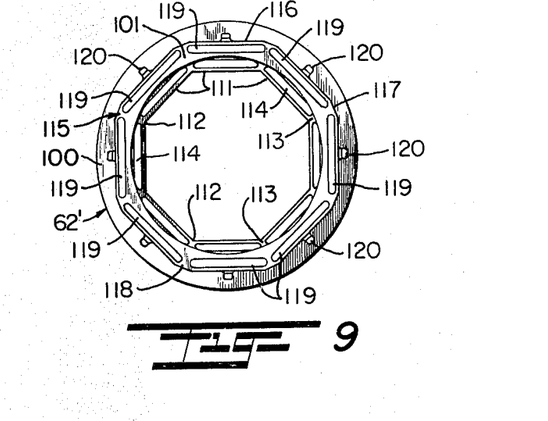
FIG. 9 is a bottom plan view of the retainer ring employed in the form of invention illustrated in FIGS. 5 to 8.

Similarly, as illustrated in FIG. 9, the lower spaced body portion 101 has a multi-sided polygonal wall section 115 disposed in outer spaced concentric relation to the inner, connecting wall 102, the wall section comprised of a series of circumferentially extending, flat elongated sides in the form of narrow panels 116 joined in end-to-end relation to one another and further joined at their ends 117 by radially extending webs 118 from the connecting wall 102 so as to leave elongated channels or cavities 119 between the sides 116 and the connecting wall portion 102. Each side panel 116 is provided with a radially outwardly projecting rib 120 intermediate of its length, each rib extending in a vertical direction and having as illustrated in FIG. 10 an upper flat surface 121 and a lower beveled end surface 122. The ribs are dimensioned such that the outer effective diameter between diametrically opposed ribs is equal to or slightly greater than corresponds to the inner diameter of the housing wall while the diameter between the lower tapered ends of diametrically opposed ribs is just less than that of the shoulder 92 on the housing wall. Further, the effective diameter between diametrically opposed corners 117 is slightly less than the inner diameter of the shoulder 92 on the housing wall. Accordingly, the retainer ring 62 is insertable into locking relation to the housing wall 11' by pressing the ribs 120 downwardly against the upper surface of the shoulder 92 so as to compress the sides 116 inwardly and advancing the ribs downwardly through the housing wall until they clear the inner surface of the shoulder 92. The ribs will then return to their original effective diameter with the upper surfaces 121 of the ribs seated beneath the ledge 92 and the undersurface 105 of the upper body portion 100 seated upon the top surface of the housing wall.

The retainer ring 62' is of unitary construction and may be composed of a plastic material or other non-magnetizable material. The thickness of the upper spaced body portion 100 is such as to lend rigidity to the entire ring, but the inner sides 111 of the upper body portion 100 and the outer sides 116 of the lower body portion 101 are sufficiently thin as to be possessed of a limited resiliency or give so as to permit expansion and compression as described in assembling the vial and retainer ring in the housing wall. In addition to the limited resiliency of the sides 111 and 116, the direct engagement between the inner walls 111 and the external surface of the vial 14' will frictionally retain the vial against accidental rotation with respect to the outer retainer ring. However, the frictional engagement between the external ribs 120 and inner housing wall by virtue of the limited surface contact between the ribs and housing wall will be less than that established between the sides 111 and vial so that the retainer ring is more freely rotatable than the vial with respect to the housing wall; and as the retainer ring is rotated, the vial will follow its rotation. As a result, it is necessary to anchor the outer retainer ring, such as, by manually grasping it when desired to independently rotate the vial with respect to the retainer ring and housing wall. Only on rare occasions, however, is it necessary to rotate the vial with respect to the retainer ring, such as, in setting the vial for a particular declination in a given geographical area.

In practice, the compass of the present invention will permit readings to be taken, for example, to take a bearing or line of travel by means of an azimuth scale or to determine one's position from a topographic map. As a preliminary to use of the compass 10 shown in FIGS. 1 to 4, it may be adjusted for declination, i.e., the angle between magnetic North and true North by pressing down firmly on the upper surface of the vial 14 with the thumb, so as to release it from frictional engagement with the O-ring 84 and rotating the azimuth ring until the orienting arrow A on the vial is lined up with the particular declination angle on the scale of the azimuth ring corresponding to the angle for the particular region or geographical area in which the compass is used. For instance, this angle may be an 8° declination in Texas so that in adjusting for declination errors the compass needle would point 8° east of true North; or in the State of Maine, at the 20° declination line, the needle would point 20° to the west of true North. Similarly, in the alternate form of invention illustrated in FIGS. to 10, the vial 14' may be similarly adjusted for declination by grasping the retainer ring 62' to prevent its rotation as the vial 14' is rotated to orient the arrow A' on the vial with the desired declination angle.

Once declination is set in the compass, either of two methods may be employed in taking a bearing. In the first method, the compass is held level and the sighting line through the sights 15 and 16, or sights $S_1$ and $S_2$, is pointed toward the object on which the bearing is to be taken. With the sighting line pointing straight at the object, the outer ring is turned along with the vial 14 or vial 14', as the case may be, until the orienting arrow A or A' and compass needle are aligned. In this position, the bearing to the object is the degree reading on the azimuth ring as indicated along the sighting line established between the sights 15 and 16, or $S_1$ and $S_2$. In the second method, the compass is held at eye level with the mirror adjusted so that the compass dial can be seen in the mirror. By facing toward the object in sighting along the sight line through the recess 30 in the cover, the azimuth ring and vial can be turned until the orienting arrow A or A' is once again aligned with the magnetic needle 40 or 40' which is visible in the mirror. Again, the bearing to the object is indicated by the degree reading along the sight line.

If the bearing in degrees to a particular object or destination from one's present location is known, the line of travel to that object can be determined by rotating the azimuth ring until the known bearing is along the sight line. By holding the compass in a horizontal position so that the magnetic needle is free to rotate and turning one's body until the orienting arrow A or A' is aligned with the magnetic needle, the sight line on the compass will indicate the appropriate direction of travel to the object.

In determining a position from a topographic map, the compass is placed on the map so that one of its ruled straight edges is on a line from that position to the desired destination. The azimuth ring is rotated together with the vial 14 or vial 14' so that the orienting arrow A or A' on the transparent base plate of the vial is parallel with the magnetic north lines on the map with the north side of the needle pointing towards north on the map. The bearing to the desired destination will then appear along the sight line on the sight nearest the destination. The foregoing are provided merely as illustrations of the use of the compass and the ability to selectively rotate the vial 14 or 14' and the azimuth ring 74 or 74' either individually or in unison in taking compass readings. In the form illustrated in FIGS. 1 to 4, the resilient suspension of the inner vial between the spring 54 and O-ring 84 effectively cushions the vial against any shock or impacts while eliminating any play between the parts. The same is true of the alternate form of invention in which the vial 14' is resiliently suspended by the unitary retainer ring 62' in self-centering relation to the housing wall 11' of the base 87.

It is therefore to be understood that various modifications and changes may be made in the precise construction and arrangement of elements comprising the embodiments of the present invention without departing from the spirit and scope thereof as defined by the appended claims.

We claim:

1. In a compass having a base member and a compass needle journaled in a transparent casing, said casing provided with an outer peripheral wall portion and top and bottom wall portions, said base member including an upstanding annular housing wall, the improvement comprising:
   retention means operative to resiliently mount said casing within said housing wall of said base member including first and second complementary locking means each including a pair of generally ring-like, radially expandible and contractable members on said retention means, an external shoulder on said peripheral wall portion of said casing and an internal shoulder on said housing wall of said base member, said ring-like members of said first and second complementary locking means being movable past said external and internal shoulders to expand outwardly behind said shoulder into yielding engagement with said peripheral wall portion of said casing and housing wall of said base member, respectively, whereby to retain said casing against removal from said housing wall while permitting said retention means to be manually rotated by overcoming the frictional engagement of said ring-like member betwen said retention means and said housing wall.

2. In a compass according to claim 1, said retention means including an annular body having an azimuth ring-supporting portion seated upon one end of said housing wall, and each of said ring-like members disposed in axially spaced relation to said annular body and defined by a series of circumferentially extending, normally straight sides arranged in end-to-end relation to one another and in radially spaced relation to said body.

3. In a compass having a base member and a compass needle journaled in a transparent casing, said casing provided with an outer peripheral wall portion and top and bottom wall portions, said base member including an upstanding annular housing wall provided with an internal shoulder, the improvement comprising:
   an annular spacer ring interpositioned between said casing and said housing wall;
   first complementary locking means between said spacer ring and said peripheral wall portion of said casing including a generally ring-like radially expandible and contractable locking member on said spacer ring, to lock said casing in centered relation to said spacer ring;
   second complementary locking means between said spacer ring and said housing wall operative to lock said spacer ring within said housing wall, an external shoulder on said peripheral wall portion of said casing and an internal shoulder on said housing wall of said base member, said second complementary locking means including a generally ring-like, radially expandible and contractable locking member in surrounding relation to said spacer ring, said locking members of said first and second complementary locking means being movable past said external and internal shoulders to expand outwardly behind said shoulders into yielding engagement with said peripheral wall portion of said casing and housing wall of said base member establishing yieldable, frictional engagement between said spacer ring and said housing wall whereby said second complementary locking means is operative to lock said spacer means against release while permitting said spacer ring to be manually rotated with respect to said housing wall.

4. In a compass according to claim 3, said spacer ring including an azimuth ring-supporting portion seated upon one end of said housing wall, and each of said locking members of said first and second complementary locking means defined by a radial extension of generally polygonal configuration, each radial extension having a series of circumferentially extending, normally flat, narrow elongated panels arranged in end-to-end relation to one another, and said radial extensions being disposed in axially spaced relation to one another.

5. In a compass according to claim 4, each said radial extension having said panels disposed in radially spaced relation to said spacer ring, and radially extending connecting means interconnecting said panels to said spacer ring at circumferentially spaced intervals.

6. In a compass having a base member and a compass needle journaled within a transparent casing, said casing provided with an outer peripheral wall portion and top and bottom wall portions, the combination therewith comprising:
   releasable retention means operative to releasably secure said casing to said base member, said releasable retention means including an upstanding peripheral flange sized for insertion of said casing therein, a resilient member interposed between the bottom of said casing and said base within said peripheral flange, an annular spacer surrounding the outer wall of said casing and insertable with said casing into said peripheral flange, complementary locking means including a first locking member on said spacer movable past a second locking member on said flange in the direction of insertion of said casing within said flange until said casing bears against said resilient member so as to be normally urged away from the bottom of said casing while resisting movement of said casing in the direction of release from said flange, said first locking member on said spacer defined by a split ring disposed in surrounding relation to said spacer and having an external beveled edge tapering downwardly in the direction of insertion of said spacer into said flange; and means normally establishing frictional engagement between said spacer and said casing whereby rotation of one of said spacer and casing will cause rotation of the other.

7. In a compass according to claim 6, said last-named means being defined by a ring-like member interposed between said casing and said spacer.

8. In a compass according to claim 7, said ring-like member being in the form of an O-ring of rubber or rubber-like material positioned in surrounding relation to the outer peripheral wall portion of said casing.

9. In a compass according to claim 7, said last-named means being in the form of an O-ring in surrounding relation to the outer peripheral wall portion of said casing between radial extensions on said casing and said spacer, respectively, said radial extension on said casing being yieldingly urged by said resilient member in a direction to compress said O-ring between said radial extensions.

10. In a oompass according to claim 9, said spacer provided with an azimuth scale on an upper exposed surface of said spacer in surrounding relation to said casing.

11. In a compass according to claim 6, said second locking member of said flange defined by a ledge protruding inwardly from the inner wall surface of said flange whereupon movement of said first locking member in the direction of insertion of its outer beveled edge is yieldingly engageable with said ledge so as to move past said ledge and to expand outwardly behind said ledge to retain said spacer against removal from said flange.

12. In a compass having an elongated transparent base plate member and a compass needle journaled on a fluid-filled, transparent vial, said vial having a casing provided with an outer peripheral wall portion and top and bottom wall portions defining a sealed enclosure, the improvement comprising:

releasable retention means operative to releasably secure said casing to said base plate member, said releasable retention means including an upstanding peripheral flange sized for insertion of said casing therein, a spring member interposed between the bottom of said casing and said base plate member within said peripheral flange, a ledge integral with said flange protruding inwardly from said flange toward said outer peripheral wall of said casing, and an azimuth ring including a spacer engageable with the outer wall of said casing and insertable with said casing into said peripheral flange with said spacer disposed in close-fitting relation to said ledge, said spacer having locking means yieldably engageable with said ledge so as to be movable past said ledge in the direction of insertion of said casing within said flange until said casing bears against said spring member while resisting movement of said casing in the direction of release from said flange, said releasable retention means releasably securing said casing to said base plate member while permitting rotation of said casing and said azimuth ring with respect to said base plate member; and radial extension members including a first outward radial extension on said casing and a second inward radial extension on said spacer axially spaced above said first radial extension, and a frictional ring member interposed between said radial extension members, said releasable retention means operative to normally compress said frictional compressible ring member between said radial extension members.

13. In a compass according to claim 12, including a hinged cover having a mirror on the inner surface of said cover, and means hingedly connecting said cover to one end of said base plate whereby to permit said cover to be folded over said vial.

14. In a compass according to claim 12, wherein said locking means is defined by a split ring member insertable into an external groove on said spacer.

15. In a compass according to claim 12, said spring member being in the form of an undulating spring of annular configuration.

16. In a compass according to claim 12, said upstanding peripheral flange being of circular configuration and having diametrically opposed sights on the upper surface of said flange.

17. In a compass according to claim 12, said vial being concentrically positioned within said peripheral flange.

18. In a compass according to claim 12, a cover disposed in hinged relation to one end of said base plate member, said cover movable into surrounding relation to said peripheral flange.

* * * * *

UNITED STATES PATENT AND TRADEMARK OFFICE
CERTIFICATE OF CORRECTION

PATENT NO. : 4,438,568
DATED : March 27, 1984
INVENTOR(S) : Melvin G. Kramer et al It is certified that error appears in the above—identified patent and that said Letters Patent is hereby corrected as shown below:

Column 1, line 6, after "abandoned" add -- , --.

Column 1, line 33, cancel "331,747" and substitute -- 2,331,747 --.

Column 11, line 30 (Claim 10) cancel "oompass" and substitute -- compass --.

Signed and Sealed this

Thirteenth Day of November 1984

[SEAL]

Attest:

GERALD J. MOSSINGHOFF

Attesting Officer         Commissioner of Patents and Trademarks